UNITED STATES PATENT OFFICE.

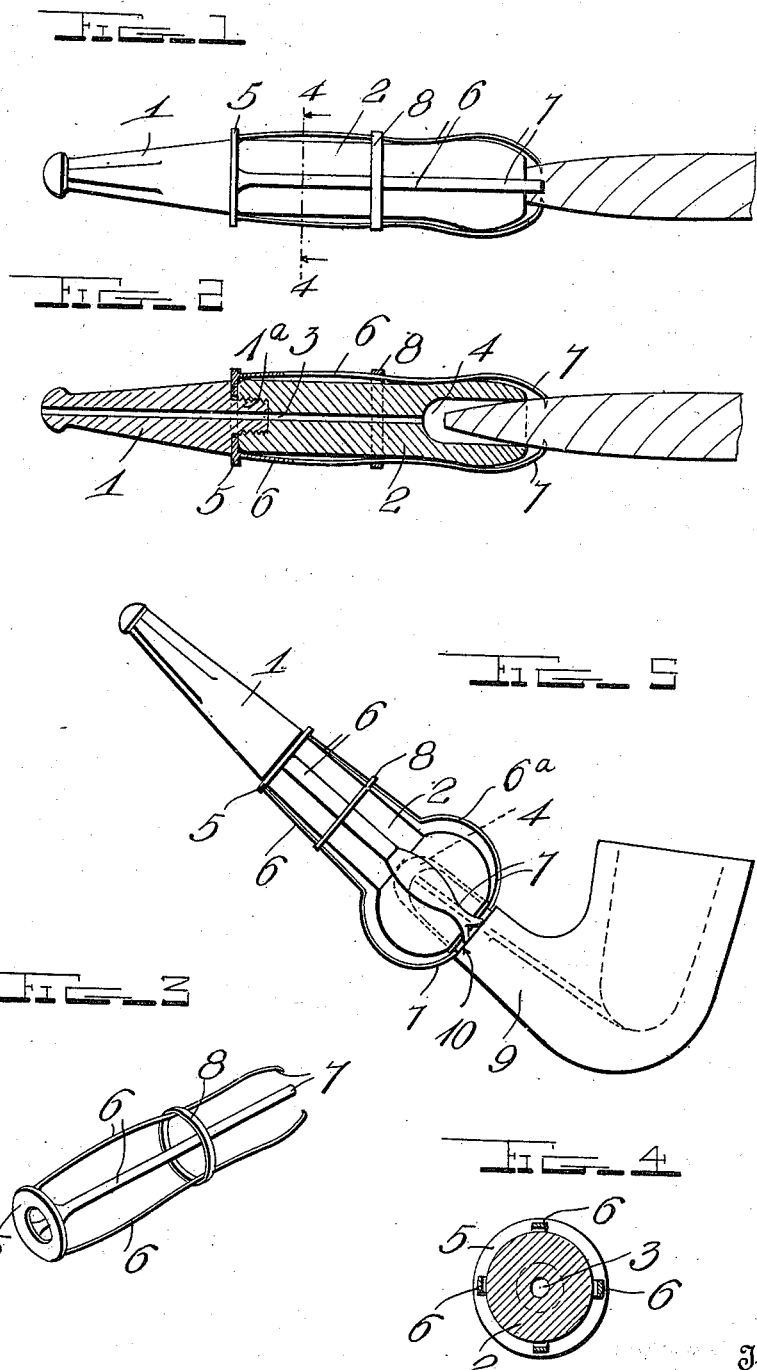

GEORGE WOLFF, OF WEST HOBOKEN, NEW JERSEY.

CIGAR-HOLDER.

972,970.  Specification of Letters Patent.  Patented Oct. 18, 1910.

Application filed May 5, 1910. Serial No. 559,441.

*To all whom it may concern:*

Be it known that I, GEORGE WOLFF, a citizen of the United States, residing at West Hoboken, in the county of Hudson and State of New Jersey, have invented certain new and useful Improvements in Cigar-Holders; and I do declare the following to be a full, clear, and exact description of the invention, such as will enable others skilled in the art to which it appertains to make and use the same.

This invention relates to an improvement in cigar holder attachments.

The object of the invention is to provide a simply constructed and efficient attachment for application to a cigar or cigarette holder which may be equally well applied for holding a pipe.

With the foregoing and other objects in view the invention consists of certain novel features of construction, combination and arrangement of parts as will be more fully described and particularly pointed out in the appended claims.

In the accompanying drawings, Figure 1 represents a side elevation of a cigar holder showing this improved attachment applied. Fig. 2 is a longitudinal sectional view. Fig. 3 is a perspective view of the attachment. Fig. 4 is a detail cross section on the line 4—4 of Fig. 1. Fig. 5 is a side elevation of a slightly modified form of the invention showing it used for holding a pipe bowl.

In the embodiment illustrated, a mouth piece 1 is shown which is separably connected with a ferrule or stem 2 by any suitable means. This connecting means preferably consists in forming the stem 2 with an internally screw threaded socket centrally arranged for the reception of a reduced screw threaded nipple 1ª, formed on the end of the mouth piece 1. The usual bore 3, extends through said mouth piece and ferrule terminating at the outer end of said ferrule in a socket 4 for the reception of the cigar or cigarette which is to be smoked. This improved attachment comprises an annular member 5 having any desired or suitable number of spring clamping fingers 6 extending longitudinally therefrom. These fingers are preferably made integral with said ring 5 and are provided at their free ends with inwardly extending prongs as 7, which may be of any suitable or desired shape for engaging the cigar or cigarette to be supported. The ring or annular plate 5 is arranged on the nipple 1ª and detachably clamped between the stem 2 and the mouth piece 1, as clearly shown in Fig. 2. A ring 8 is slidably mounted around these clamping fingers 6, for varying the gripping action thereof.

The ring 5 preferably projects laterally beyond the outer face of the fingers and serves as a stop to limit the rearward movement of the ring 8 and prevent its accidental disengagement from the holder.

The socket 4 is preferably provided with an absorbent material as a sponge, cotton or the like to prevent moisture from coming in contact with the pipe stem or cigar to be smoked.

In the form shown in Fig. 5 the pipe stem 9 tapers toward its free end and is provided adjacent said end with an annular groove 10 to receive the prongs of the clamping fingers 6 whereby the pipe may be securely held connected with the holder without any screws being used to provide for its being easily cleaned. In this form of the invention the outer ends of the retaining fingers are bulged outwardly to a greater extent as shown at 6ª, so that they may extend around the ferrules or enlargements frequently found on the stems of pipes.

From the foregoing description taken in connection with the accompanying drawings, the construction and operation of the invention will be readily understood without requiring a more extended explanation.

Various changes in the form, proportion and the minor details of construction may be resorted to without departing from the principles or sacrificing any of the advantages of the invention as defined in the appended claim.

What I claim is:

A device of the character set forth comprising a mouth piece having a nipple at one end, a stem having at one end a socket to receive said nipple and at its other end a socket to receive the object to be held, an annular member arranged on said nipple and clamped between the stem and mouth piece, a series of spring fingers projecting from said annular member and extending longitudinally along the exterior of the stem, said fingers being curved longitudinally and having their outer ends bent inwardly to form prongs which project beyond the outer end of the stem to engage the object, and a clamping ring slidably mounted on said fingers for varying the gripping action thereof.

In testimony whereof I have hereunto set my hand in presence of two subscribing witnesses.

GEORGE WOLFF.

Witnesses:
 CHAS. F. HAGER,
 EMILE THALLER.